A. A. & F. B. SKINNER.
COMBINED INCUBATOR AND BROODER.
APPLICATION FILED JAN. 27, 1909.
944,383.
Patented Dec. 28, 1909.
4 SHEETS—SHEET 1.
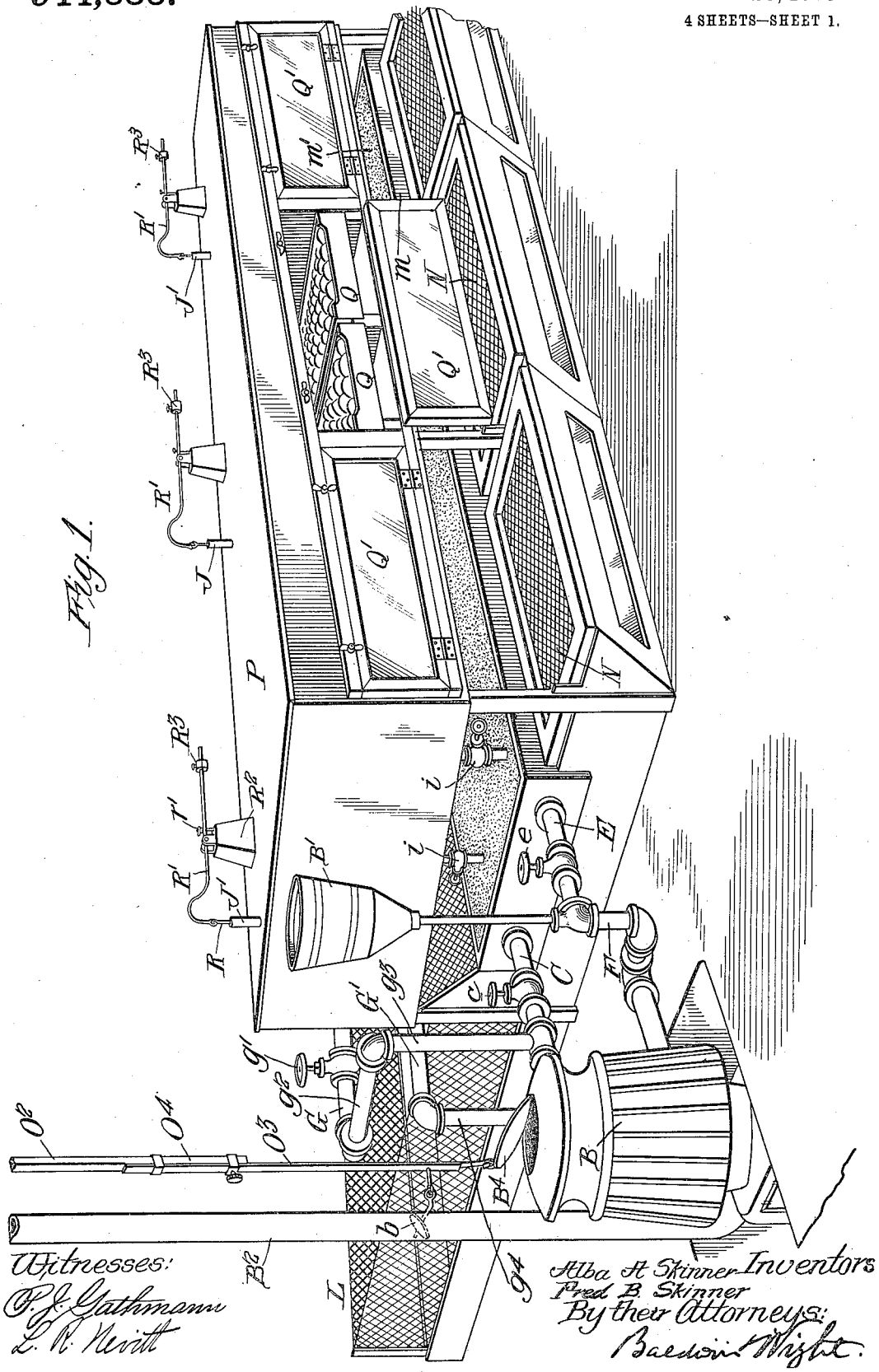

A. A. & F. B. SKINNER.
COMBINED INCUBATOR AND BROODER.
APPLICATION FILED JAN. 27, 1909.
944,383.
Patented Dec. 28, 1909.
4 SHEETS—SHEET 2.
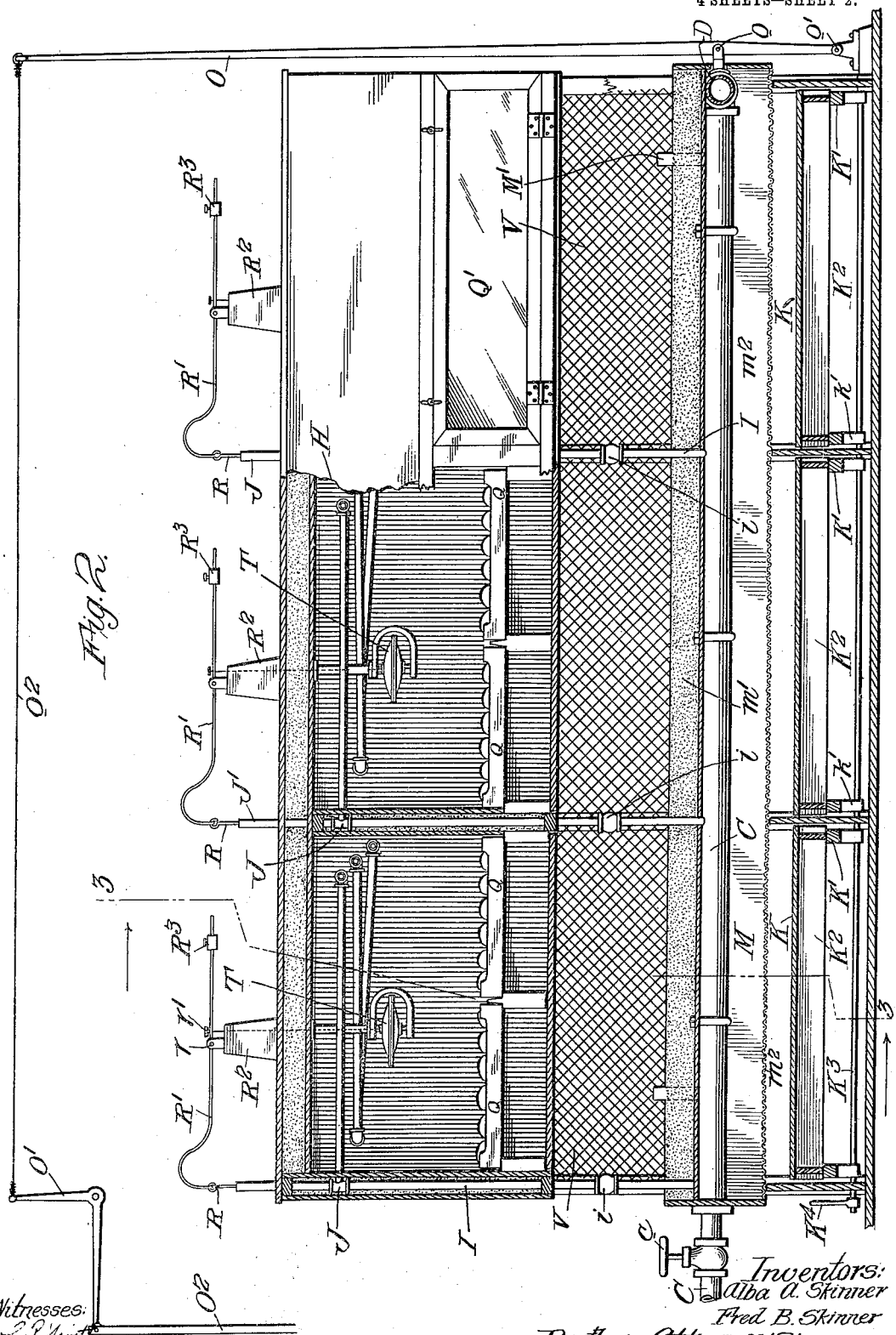
Witnesses:
Inventors:
Alba A. Skinner
Fred B. Skinner
By their Attorneys:

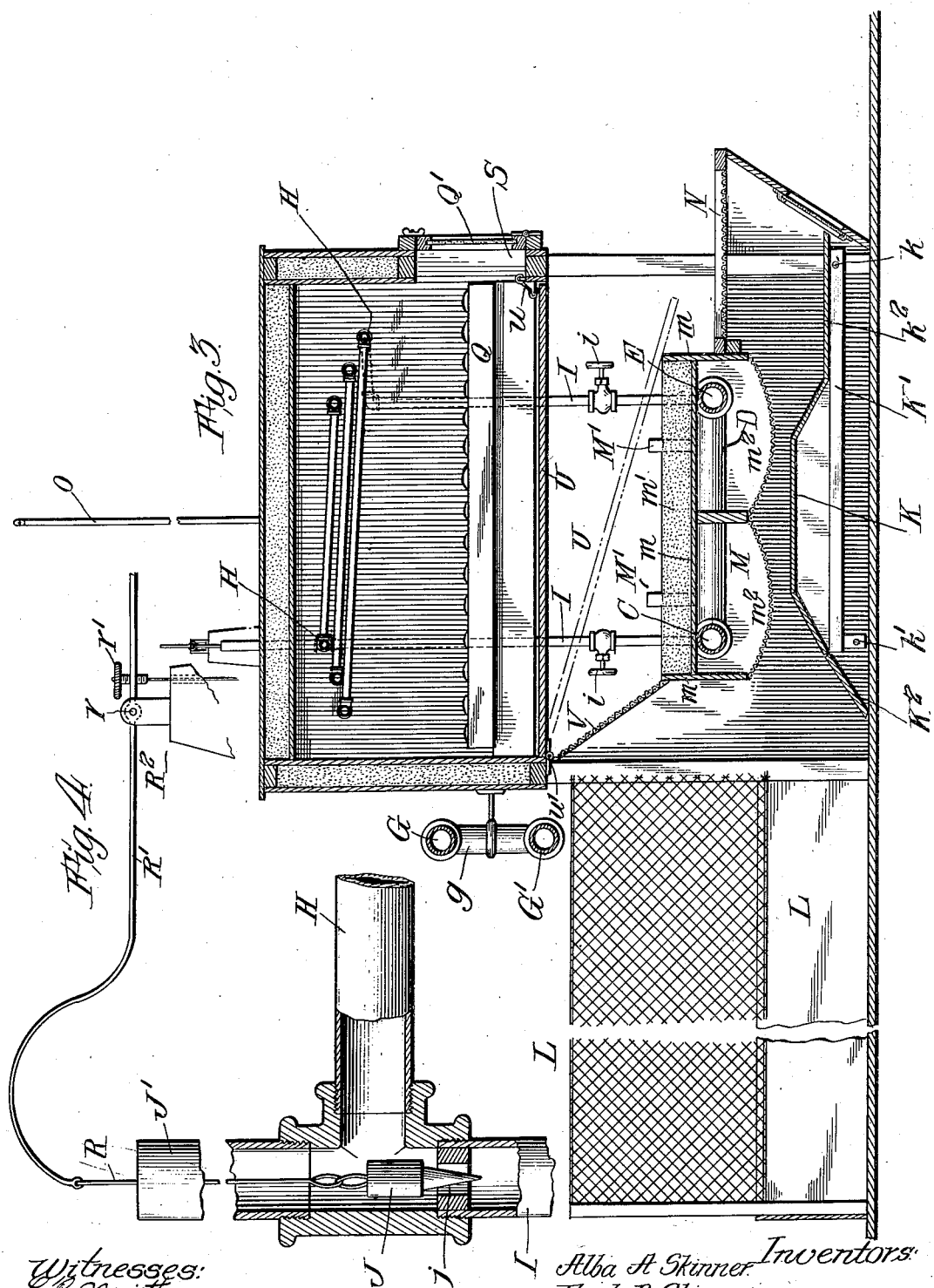

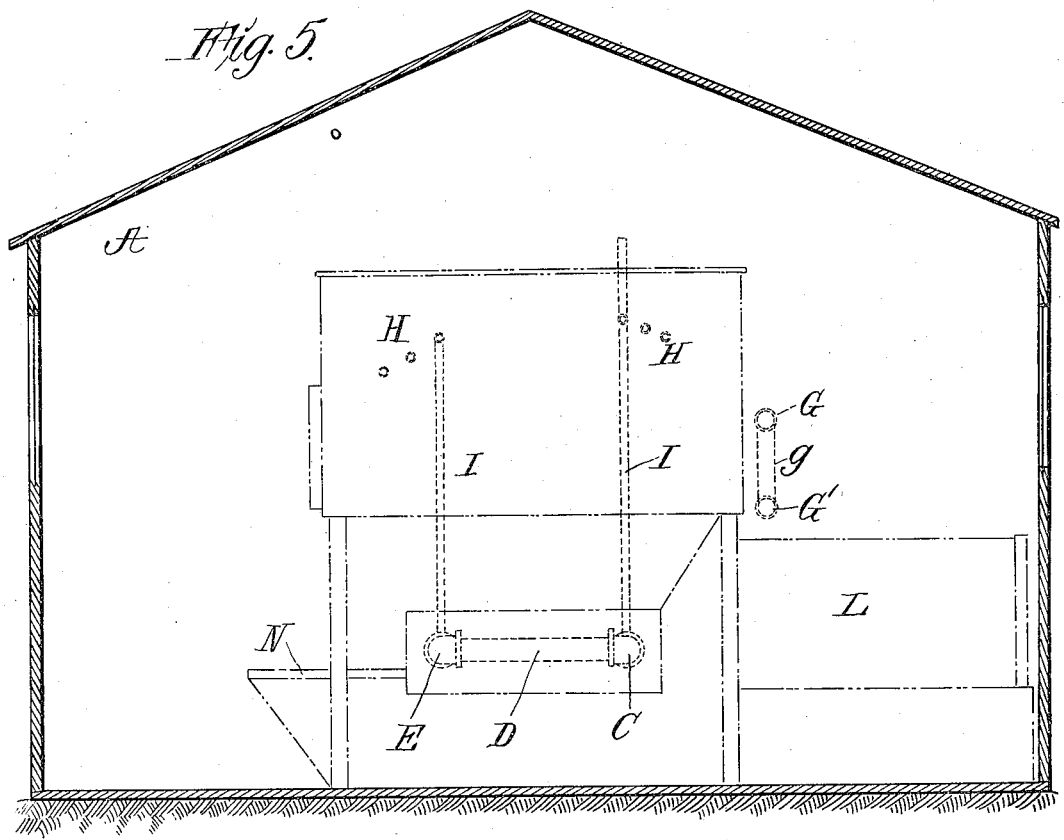

UNITED STATES PATENT OFFICE.

ALBA A. SKINNER AND FRED B. SKINNER, OF GREENE, NEW YORK.

COMBINED INCUBATOR AND BROODER. REISSUE

944,383.    Specification of Letters Patent.    Patented Dec. 28, 1909.

Application filed January 27, 1909. Serial No. 474,366.

*To all whom it may concern:*

Be it known that we, ALBA A. SKINNER and FRED B. SKINNER, both citizens of the United States, and both residing in Greene, in the county of Chenango and State of New York, have invented certain new and useful Improvements in Combined Incubators and Brooders, of which the following is a specification.

The object of our invention is to provide an efficient apparatus for continuously hatching and brooding chickens and other fowls.

In carrying out our invention we provide a suitably heated building having runs for the young fowls and within which our combined incubator and brooder is located. The incubator is preferably divided into sections containing removable egg trays and has separately controlled heating appliances, while the brooder is heated by a separately controlled system of heating pipes operating in connection with an adjustable brooding platform and a hover below the incubator. In the lower portion of the incubator there is a nursery having a floor which can be conveniently lowered so that the young fowls at the proper time can be conveyed to the brooder.

The heating apparatus is so organized that the brooder is heated by a primary hot water circulation, the temperature of which is automatically controlled by the automatic opening and closing of the draft dampers of the heater, while the incubator is heated by a secondary water circulation drawn from the primary circulating system and controlled by automatically acting thermostats whereby the temperature of the incubator is controlled independently of the primary heating system.

The details of construction are hereinafter fully described and the subject-matter deemed novel is set forth in the claims.

In the accompanying drawings, Figure 1 is a perspective view of our combined incubator and brooder. Fig. 2 is a view partly in front elevation and partly in section of a part of the combined incubator and brooder. Fig. 3 shows a transverse section on the line 3—3 of Fig. 2 looking in the direction of the arrows. Fig. 4 is a detail view on an enlarged scale partly in elevation and partly in section showing the devices for automatically controlling the circulation in the secondary heating system or that passing through the incubator. Fig. 5 shows a transverse section through the house in which the combined incubator and brooder is located, the latter being indicated in dotted lines. Fig. 6 shows diagrammatically the arrangement of the pipes in the two heating systems.

We preferably arrange the combined incubator and brooder in a suitable house, such as that indicated at A in Fig. 5, the particular construction of which is however not important, but preferably a house of this general kind is employed, in which the runs for the young fowls are located, and it is kept at a suitable temperature as hereinafter explained.

We preferably divide the incubator and brooder into sections and the different sections of the incubator may be separately opened and closed and the temperature thereof may be separately controlled.

In Fig. 1 we have shown a hot-water heater B of any suitable construction or of the kind commonly used in apparatus of the class to which our invention relates. To the upper part of this heater is connected a pipe C having a controlling valve at $c$ near the heater and which extends horizontally through the lower portion of the apparatus and is connected by a transversely arranged branch pipe D with a return pipe E parallel with the pipe C provided with a valve $e$ and connected by pipes and couplings at F with the lower portion of the heater B. A circulation of hot water may be maintained in this way through the pipes C, D and E. The boiler is supplied with water through a tank B' in the usual way and the heater is provided with a smoke pipe $B^2$ having a damper $b$, and the usual check draft or damper $B^4$ is provided at the top of the heater.

In order to heat the house in which the combined incubator and brooder is located, we provide pipes G, G' arranged one above the other connected by a vertically arranged pipe $g$ at one end, one pipe G being provided with a valve $g'$ and a branch pipe $g^2$ which is connected by a vertical pipe $g^3$ with the pipe C or with the heater B. The return pipe G' is connected by a pipe $g^4$ with the lower portion of the heater B. By this arrangement of pipes a heating circulation is kept up sufficient to keep the interior of the building A at the proper temperature. This circulation can, of course, be shut off during warm weather by the valve $g'$. A secondary circulation is kept up in a system of pipes H, illustrated diagrammatically in Fig. 6. These pipes are located above the system of pipes C, D, and E, as more clearly illustrated in Fig. 3. The pipes H are connected with the pipes C and E by vertical pipes I which may be provided with stop valves at $i$, as illustrated in Fig. 2, and each of these pipes is provided with an automatic valve J hereinafter more particularly described.

The brooder, as shown in Fig. 3, is located on the ground floor. It is preferably divided into sections, each section having a platform K resting on horizontal beams or supports $K'$ which are hinged or pivoted at $k$ and which are supported at their opposite ends by turn buttons $k'$ by means of which the platform may be held at different elevations. Each platform has hinged to it a bridge $K^2$ which moves up and down with the platform and which is for the purpose of affording a way for the young fowls to travel down to the ground level toward the run L which is constructed in any suitable way inside the house A. As the run illustrated is of well known construction it will not be described in detail.

Immediately above the platform K in each section there is a hover M comprising frame pieces $m$, a filling $m'$ of sawdust or other suitable material calculated to retain heat, and pieces of carpet $m^2$ or other like material suitable to act as a hover for the fowls. The pipes C and E extend through the hovers below the filling $m'$ and above the carpet $m^2$ and maintain a suitable temperature in the hovers. Each hover operates in the usual way, the chicks or young fowls congregate on the platform K beneath the carpet $m^2$ and when they so desire may pass down over the bridges $K^2$ into the runs L. The portion $k^2$ of the platform K is arranged beneath a removable cover N comprising a frame with a filling of wire netting. Food may be thrown onto the platform section $k^2$ and the fowls may feed there and then conveniently go back to the hovers when they so desire. The hover may be ventilated by pipes $M'$ extending vertically upward from the interior of the hover into the space below the incubator which opens to the outside.

The rear or outer end of the pipe C is connected in the manner indicated in Fig. 2 at $o$ with a vertically arranged lever O pivoted to the floor at $o'$ and connected at its upper end by means of a wire $o^2$ with a bell crank lever $O'$ in turn connected by a rod $O^2$ with another rod $O^3$ attached to the check draft or draft damper $B^4$. Preferably we employ an adjustable connection at $O^4$ between the rods $O^2$ and $O^3$, and the damper $b$ is connected with the rod $O^3$ in such manner that when the check damper $B^4$ is raised, the damper $b$ is opened, and when the damper $B^4$ is closed, the damper $b$ is also closed. The arrangement is such that the lever O is operated by the expansion and contraction of the pipe C, that is to say, when the heat rises the pipe C expands or lengthens and gives a corresponding movement to the lever O which, through the connections before described, operates the dampers. When the pipe C contracts or shortens, a reverse movement is given to the lever O and through the connections specified to the dampers. In this way the temperature in the primary heating system can be automatically controlled and the mechanism may be adjusted at the adjustable connection $O^4$. The temperature in the incubating sections is independently controlled both positively and automatically in the manner hereinafter described.

The incubator P is preferably divided into sections inclosed by packed walls, as illustrated, and having removable egg trays Q. The incubator sections have doors $Q'$ which are preferably glazed and the trays are so supported that warm air can circulate about them and they can be conveniently removed and replaced when desired. The heating pipes H are arranged above the trays, the return pipes of the system preferably being on a lower level than the other set of pipes as illustrated in Fig. 3. The parts of the pipes H in each incubator section are connected to the pipes C, E, of the primary circulating system by means of the vertical pipes I having the valves $i$, above referred to, and preferably the pipes I extend through the packed side walls of the incubator sections, as illustrated in Fig. 2. One of the pipes I in each incubator section, that is, the one connected with the pipe C, is provided with the automatic valve J, before referred to and which is illustrated on an enlarged scale in Fig. 4. This valve is contained in a T-coupling which connects the pipe I with the pipes H and with a vent pipe $J'$ through which air can escape. The valve J is preferably of the shape illustrated so that the opening $j$ in the valve seat may be gradually closed or opened. There is a valve J in a pipe I in each incubator section and each of these valves is connected by means of a link R with a lever $R'$ pivoted at $r$ to a standard $R^2$ and carrying an adjustable weight $R^3$. Each lever $R'$ carries an adjusting screw $r'$ connected in the manner shown, with a thermostat T of well known construction commonly used in incubators, and which is so operated that when the heat rises to too great an extent, the valve J is closed or partially closed, but when the heat falls, the valve J is opened by means of the counterbalancing weight $R^3$.

By adjusting the screw r' the valve may be made to operate to maintain any desired temperature in the circulating system of each incubator section.

Each incubator section has a space S in front of and below the egg trays where the young fowls after they are hatched accumulate, and there is also a space below the egg trays below which there is a hinged floor U normally held raised by fastening devices u. When the fowls are hatched, the floor U may be lowered to the position shown by dotted lines in Fig. 3 and the cover N may be removed allowing the young fowls to pass into the brooder. Preferably a wire netting partition V is arranged in the rear part of the apparatus extending from the hover frame M upwardly and rearwardly to the hinges u' of the floor U.

After the circulating pipes are filled with water and the temperature has been raised to the desired extent, the controlling devices are adjusted and the trays with the eggs are placed in the incubator section. The temperature in the incubator may be for a time watched and the screws r' may be suitably adjusted, but after that the desired temperature will be automatically maintained. The eggs are turned from time to time in the usual way and after the incubating period has elapsed, the young fowls will drop to the spaces S and find their way onto the hinged floors U, then the covers N may be removed and the floor U lowered so that the fowls can pass into the brooder. They will use the hover in the customary way and can readily pass to the runs L and find their way back to the hover when they so desire. The platforms K beneath the hover can be lowered and raised from time to time either separately or simultaneously. In Fig. 2 we have shown the turn buttons k' as all being carried on a rod K³ which may be operated by a handle K⁴. When the young fowls have been thus transferred to the brooder, trays with a new supply of eggs may be placed in the incubator so that while fowls are being nursed in the brooder, eggs may be undergoing the process of incubating or hatching in the incubator and it is also possible to make the process continuous by starting the incubation at different times in different sections of the incubator and correspondingly using the brooder sections.

We claim as our invention:

1. A combined incubator and brooder, the latter provided with a primary heat circulating system confined to the brooder and the former with a secondary heat circulating system confined to the incubator and drawn from the primary system, means for automatically and separately controlling the temperature in the brooder, and thermostatic devices in the incubator for controlling the passage of the heating fluid from the primary to the secondary circulating system, and thus controlling the temperature in the incubator.

2. In a combined incubator and brooder, a primary hot water circulating system confined to the brooder, means for automatically controlling the temperature thereof, a secondary hot water circulating system confined to the incubator supplied from the primary circulating system, and thermostatic devices for automatically controlling the passage of hot water from the primary to the secondary system and to thus regulate the temperature in the incubator without affecting the temperature in the brooder.

3. The combination of an incubator, a brooder beneath it, a hot water heater, circulating pipes passing through the brooder and connected with the hot water heater, a damper connected with the heater, connections between the circulating pipes in the brooder and said regulator whereby the expansion and contraction of said pipes control the position of said heat regulator, a secondary hot water circulating system in the incubator supplied from the primary system, valve mechanism controlling the passage of hot water from the primary system to the secondary system, and thermostatic devices in the incubator for operating said valve mechanism to regulate the passage of hot water from the primary to the secondary system and to thus control the temperature in the incubator without affecting the temperature in the brooder.

4. The combination of a brooder provided with a vertically adjustable platform, a hover above it, hot water circulating pipes for heating the hover, a removable cover above one end of the platform, an incubator above the brooder having a hinged floor whereby the young fowls may readily descend from the incubator to the brooder, hot water circulating pipes in the incubator which are supplied from the hot water circulating pipes in the brooder, valve mechanism controlling the passage of hot water from the pipes in the brooder to those in the incubator, thermostatic devices for regulating the temperature of the hot water circulating in the pipes of the brooder, and thermostatic devices in the incubator for operating the valve mechanism to control the passage of hot water from the pipes of the brooder to the pipes of the incubator, and to thus regulate the temperature in the incubator without affecting the temperature in the brooder.

In testimony whereof, we have hereunto subscribed our names.

ALBA A. SKINNER.
FRED B. SKINNER.

Witnesses:
LYDIA M. GRAY,
LAURA S. SKINNER.